Nov. 28, 1950 P. C. McLEMORE 2,531,884
APPARATUS FOR CULTIVATION OF PLANTS
Filed Nov. 26, 1945 2 Sheets-Sheet 1

Inventor:
Price C. McLemore
By Brown Jackson Boettcher Dienner
Att'ys

Nov. 28, 1950 P. C. McLEMORE 2,531,884
APPARATUS FOR CULTIVATION OF PLANTS
Filed Nov. 26, 1945 2 Sheets-Sheet 2

Inventor:
Price C. McLemore.
By Brown Jackson Boettcher Dienner
Attys

Patented Nov. 28, 1950

2,531,884

UNITED STATES PATENT OFFICE 2,531,884

APPARATUS FOR CULTIVATION OF PLANTS

Price C. McLemore, The Oaks, Waugh, Ala.

Application November 26, 1945, Serial No. 630,895

6 Claims. (Cl. 126—271.2)

My present invention relates to an improvement in an apparatus for cultivation of plants.

The present application is a continuation-in-part of my copending application Serial No. 364,140, filed November 4, 1940, now Patent No. 2,408,328, dated September 24, 1946, which application in turn is a division of my application Serial No. 298,870, filed October 11, 1939, issued as Patent No. 2,327,204, on August 17, 1943.

In my aforesaid applications and patents I have disclosed a method of and apparatus for selectively suppressing or destroying obnoxious vegetation incidental to growing crop plants by subjecting the obnoxious vegetation and standing crop plants simultaneously to heat for a period long enough to selectively injure or destroy the obnoxious vegetation without doing substantial injury to the plants. This method of cultivating plants by heat is disclosed and claimed in my aforesaid Patent No. 2,327,204 which patent also further discloses and claims cultivation of crops by heat in the form of a flame. In my application first referred to above now issued as Patent No. 2,408,328, and in the application resulting in the above Patent No. 2,327,204, as originally filed, there is disclosed the selective destruction of obnoxious vegetation by heat in the form of hot fluids such as steam generated in a suitable steam generator or of any other suitable vapor or gas, such as air, in addition to the species of my invention in which a flame is used for this purpose. My present application is directed to a method and apparatus embodying the species of effecting cultivation of plants by heat in the form of hot fluid.

In the cultivation of crops by heat in the form of a flame it has been found that unless the burners, which are disposed close to the ground and base of the crop, are accurately adjusted there is danger of unvaporized fuel being discharged and directed into the crop row the ignition of which unvaporized fuel by the flame projected by the burner causes burning of the crop. In other words with a burner it is difficult to effect complete combustion of the fuel at the point of the nozzle.

It is an object of my present invention, therefore, to provide a method and means of cultivating crops in which selective destruction of obnoxious vegetation is effected by bathing the obnoxious vegetation and stems of the crops with the products of combustion developed by combustion of fuel in a chamber to which the combustion is confined a length of time sufficient to injure or destroy the obnoxious vegetation without substantial injury to the plant.

I propose to accomplish the above object by providing a vehicle, preferably a tractor or draft vehicle adapted to be drawn by a tractor, for travelling along a crop row which is provided with means for generating hot gaseous products of combustion and with which suitable nozzles are associated for directing the hot gases upon the ground in the manner as is now well known in the flame method of plant cultivation.

This approach to the problem of selective destruction of obnoxious vegetation by heat in the form of vapors and gases has several advantages. For example, the hot gases may be developed at a central generating unit in which combustion is confined carried by the vehicle which eliminates the requirement of separate burners at each point where it is desired to apply heat. In providing a central unit for the development of gases, the temperature thereof may be controlled at the source as distinguished from adjustment of individual burners so the gases discharged along either side of the crop row will be at the same temperature effecting uniform application of heat at both sides of the crops. In addition to providing for better control of the temperature of the medium through which heat is utilized to effect cultivation, the use of hot gases or vapors developed in the manner aforesaid enables the discharge thereof at a temperature below the flaming temperature of the fuel used in generating the gases whereas, in the use of burners, the projected flame is at substantially the flaming point of the fuel used in the burners. Thus, the gaseous products for the cultivation of the crops may be at a lower temperature than the flame of the flame method of cultivation, whereby the plants and weeds may be subjected to the hot gases for a longer period of time than a flame to more expeditiously effect cultivation of the plants without injury thereto. Also in the generation of gases free of combustible particles or combustible gaseous products at a central source, there is no danger of projecting combustible matter on the plants or about the crop rows thus eliminating the danger of any unvaporized fuel or combustible matter from becoming ignited and causing undue burning of the crops. Further, many different types of fuel may be used for developing the hot gases such, for example, as heavy fuel oil, powdered coal or other pulverized fuel which is an advantage over the use of burners which in the main operate effectively only on liquid fuel. Thus the use of expensive burners is avoided and, in addition, my present invention provides for the use of cheaper fuels than that required for burners.

A preferred structural feature of the apparatus of my invention resides in providing a vehicle adapted to travel along a crop row having a chamber in which combustion is confined for generating hot fluids and with which chamber nozzles are associated for directing the fluids from the generating means upon the ground about the crops and obnoxious vegetation to destroy or injure the latter.

A further preferred structural feature resides in providing skid mountings adjacent the lower ends of the nozzles for guiding the same over uneven ground to dispose the discharge outlets of the nozzles at the proper position with respect to the crop row and ground.

Other objects, advantages and features of my invention will appear from the detail description.

Now, in order to acquaint those skilled in the art with the manner of practicing the method of my invention and constructing and utilizing apparatus in accordance with my invention, I shall describe in conjunction with the accompanying drawings certain preferred embodiments of my invention.

Figure 1:
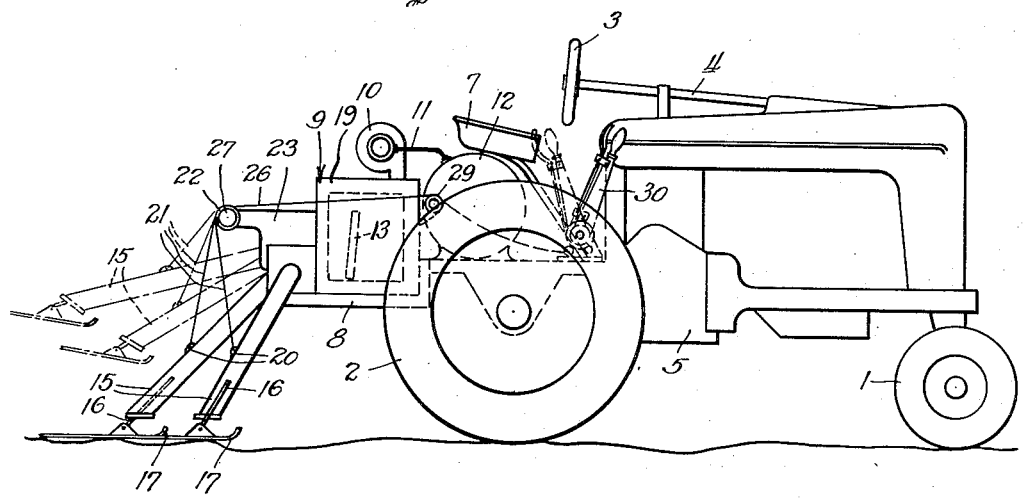
Figure 1 is a side elevational view of one form of apparatus constructed in accordance with my present invention.
Figure 2:
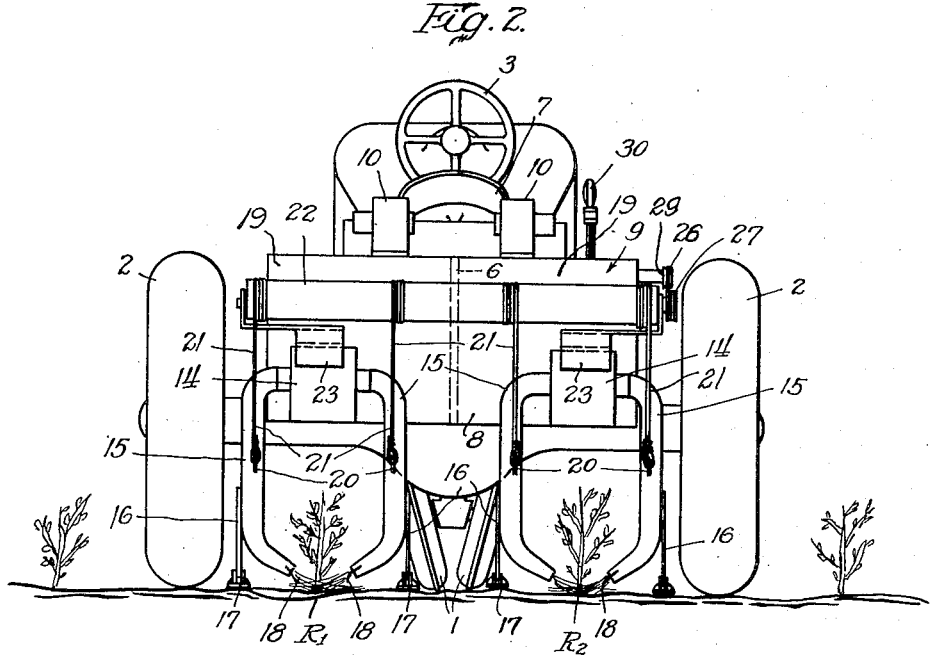
Figure 2 is a rear end view of the apparatus of Figure 1.

Referring now to Figures 1 and 2, the apparatus of my invention therein shown comprises a tractor of known construction having dirigible wheels 1—1 at its forward end and driving wheels 2—2 at its rearward end. The front wheels 1 are adapted to be steered through any suitable steering mechanism including the steering wheel 3 which has connection by means of a steering shaft 4 with any suitable known form of steering mechanism having connection with the steering wheels 1—1. The tractor wheels are carried by suitable shafts mounted on the main frame or chassis 5 in a manner well known in the art, and the main frame or chassis 5 provides for the support of a suitable power plant such as an internal combustion engine having suitable fuel supply means, exhaust pipe and other known controls for governing the starting, stopping and speed of the engine. Preferably, the tractor is provided with an automatic speed governor for maintaining a fixed speed as is also well known in the art. It will be understood that when the tractor comprises an internal combustion engine a suitable radiator is associated therewith for effecting cooling of the cooling medium for the engine which in the conventional tractor is positioned at the front end of the chassis. The tractor is also provided with a suitable operator's seat 7 in convenient position to the controls and steering wheel 3 for governing the operation of the tractor. For purposes of my present invention I have selected for illustration the type of tractor in which the front steering wheels are located so as to travel between two parallel rows of crops $R_1$ and $R_2$ with the rear wheels 2—2 being spaced to straddle the two rows of crops $R_1$ and $R_2$, as will be clear from Figure 2.

With this known form of tractor, I preferably provide an auxiliary transversely extending frame member or platform 8 suitably secured to the chassis 5 of the tractor rearwardly thereof, which frame 8 provides for the support of a combustion or hot fluid generating unit 9 by the burning of fuel oil therein. As shown in the drawings the unit 9 is divided into a pair of combustion chambers 19—19 by a vertically extending partition 6, with each chamber 19—19 having a known combination fan and pump device 10 suitably secured in the upper end wall of the unit 9. Each combination pump and fan device 10 has connection by a conduit 11 with a fuel supply tank 12 supported rearwardly on the main frame or chassis 5. It will be understood that suitable control valves may also be provided to regulate the flow of fuel from the fuel tank 12 through the conduit 11 and baffles and speed control devices may be provided for regulating the amount of air delivered by the fan of the combination fan and pump unit 10 to be heated in the combustion chambers 19—19, together with the supply of fuel thereto to effect any desired degree of heat, and by means of which control the temperature and volume of the products of combustion developed within and issued from the combustion chambers 19—19 of the combustion unit 9.

Preferably the tractor is provided with a power take-off to provide means for driving the combination fan and pump devices 10 or if desired an auxiliary small gasoline engine may be provided for this purpose. The aforesaid controls for regulating the flow of fuel and air to a combustion chamber, together with the power take-off mechanisms for tractors or auxiliary motor drives for effecting operation of auxiliary equipment, are well known expedients in their respective arts and for this reason it is believed that they need not be further shown or described for an understanding of my present invention. These details may vary widely in their scope and adaptation to my invention which in its essentials so far described contemplates the use of any suitable generating means or apparatus for developing hot fluids.

It will be observed from Figure 2 that the combustion unit 9 extends transversely of the tractor substantially for the full width thereof between the pair of rear wheels 2—2 with the combustion chambers 19—19 each being provided with an outlet housing section 14. Each of the housing sections 14 have a pair of ducts 15—15 forming a distributing duct system pivotally associated therewith for rotation about substantial horizontal coaxial axes. As shown in Figure 1 a baffle 13 may be incorporated in each of the chambers 19—19 of the unit 9 at the connection between these chambers with the outlet housing sections 14 to prevent the passage of solid products of combustion into the latter. Each pair of ducts 15—15 are arranged to be disposed on either side of two pair rows of crops $R_1$ and $R_2$, as will be clear from Figure 2. The ducts 15 each have a bar frame member 16 secured to the outer sides thereof, which bars 16 at their outer ends have pivotal connection with a skid 17. The skids 17, as more clearly illustrated in Figure 1 are adapted to support the ducts 15 with the nozzles 18 thereof directed diagonally downwardly and inwardly of the crop rows $R_1$ and $R_2$, which it is desired to cultivate with the generated fluids issuing from the housing sections 14 through the nozzles of ducts 15. Each pair of ducts 15—15 associated with each of the outlet housing sections 14—14 of the combustion chamber 9 are of different lengths so that the discharge nozzles 18—18 thereof are offset with respect to each other and lengthwise of a crop row so that the hot gases issuing from the outlets of the ducts project the hot gases across the crop rows in non-opposing relation with respect to each other. As indicated in Figure 2, the downwardly inclined outlet or nozzle discharge ends 18 of ducts 15 are preferably disposed with their axes intersecting the ground at the base of the crop row so that the hot gases are projected upon the ground about the stems of the crops below the foliage thereof and the obnoxious vegetation surrounding the crop. The vehicle is moved at a rate of speed along the rows of crops so that the hot gases issuing from the outlets of the ducts is for a sufficient length of time to effect the destruction or injury of the obnoxious vegetation without doing substantial injury to the crop. In Figure 1 I have shown the pair of ducts 15, 15 at the near side in their operative positions with the pair of ducts to the far side of the vehicle, as viewed in this figure being shown in raised or inoperative position. In order to effect raising of the ducts 15, 15 from the operative position to the inoperative position, it will be observed that each duct is provided with an eyelet member 20 to which one end of a cable 21 is fastened with the other end of the cable being secured to a rotatable drum 22, the opposite ends of which are rotatably supported in the laterally extending brackets 23—23 supported by the outlet housing sections 14—14 of the combustion unit 9. A cable 26 extends from a drum 27 of smaller diameter than drum 22 and fixed to one end thereof. The cable 26 is trained over a pulley 29 with the other end of the cable 26 having connection with a lever 30 suitably supported on the frame or chassis of the tractor and in a position to be easily grasped by the operator. Upon grasping of the lever 30 and moving it from its full line position, as shown in Figure 1, to the broken line position the drum 22 is caused to be rotated through the cable 26 to raise the ducts 15 about their horizontal pivotal mountings by winding of the cables 21 on drum 22 into inoperative position as shown in broken lines in Figure 1. It will be observed that in the above described embodiment of my invention a pair of combination fan and pump devices 10 are shown, and that the combustion unit 9 comprises separate combustion compartments so that if desired combustion may be carried out in one combustion compartment which together with the associated pair of ducts 15—15 may be used in the cultivation of one row of crops at a time. It will also be apparent to those skilled in the art that if desired a single combination pump and fan device may be suitably arranged with a single combustion chamber having suitable nozzles associated therewith for projecting hot fluids at more than one point along the side of one or more crop rows.

Figure 3:
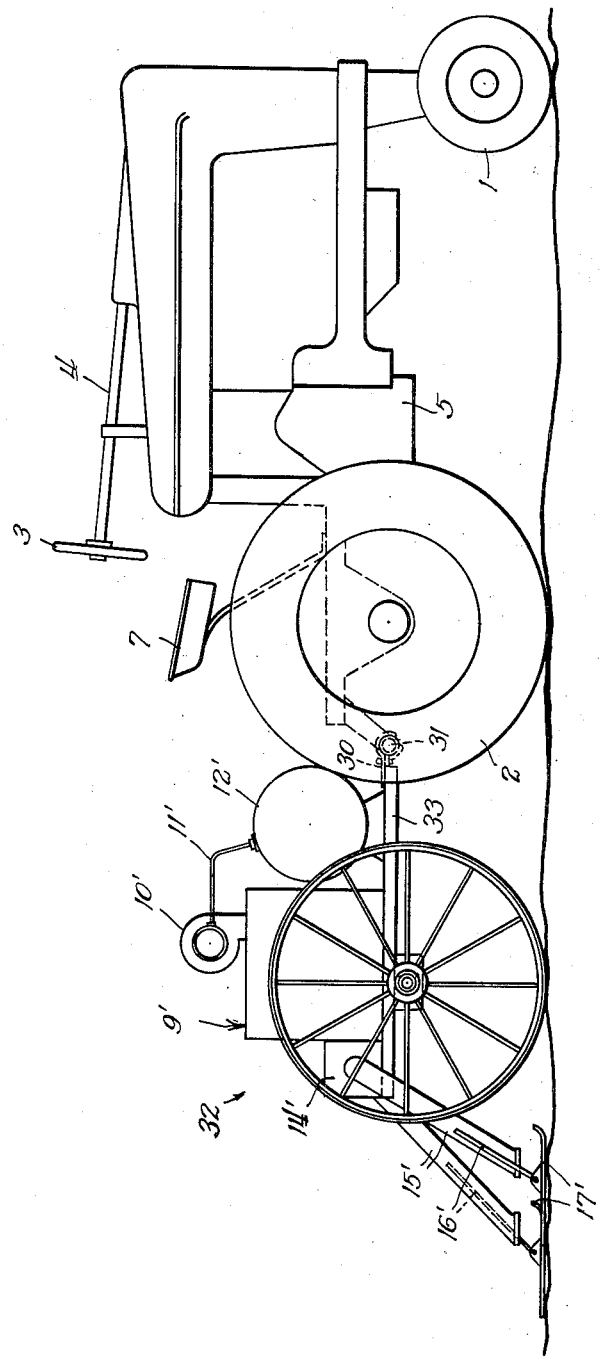
Figure 3 is a side elevational view of a modified form of apparatus embodying my invention.

In the embodiment of Figure 3, I have shown a tractor similar in most respects to the tractor described in connection with Figures 1 and 2 and in which like reference numerals indicate like or similar parts. However, in the form of the invention shown in Figure 3, the cultivating unit is mounted on a separate draft vehicle or two wheel cart having a hook 30 which is adapted to have connection with a transversely extending cross bar 31 rearwardly of the tractor for drawing the vehicle or cart 32 along a crop row. Also, in this form of the invention the fuel supply tank 12' is carried by the draft vehicle 32 rather than directly on the tractor. In this form of the invention the draft vehicle 32 comprises a platform or frame 33 which is adapted to provide for the support of the fuel supply tank 12', and combustion unit 9' which, as before, has suitably associated therewith a combination fan and pump device 10'. Also, as before, the chamber for generating the hot gases is provided with an outlet housing 14' with which the ducts 15' have connection in the manner described and which ducts 15'—15' are supported by the ground engaging skids 17' in the manner previously described. Any suitable power source may be utilized for driving the pump and fan as previously described.

It will be understood that in both embodiments of the invention shown in Figures 1 and 2, and 3 that the units 9 or 9' may either comprise a combustion chamber for the burning of fuel oil, as above described in the preferred embodiments of my invention, or may comprise suitable known forms of furnace constructions for burning pulverized coal or other solid material or other fuels. It is believed, therefore, that the somewhat diagrammatic showing of a fuel supply means and of the means for generating a hot fluid is sufficient for a disclosure of the present invention in that these features may vary quite widely in their arrangement and incorporation in a suitable vehicle for travelling along the crop row to effect the cultivation of crops by directing the generated fluid through nozzles upon the ground and about the plant stems to destroy the obnoxious vegetation or weeds growing thereabout without destruction of the crop.

The method involved in utilizing the above apparatus for the cultivation of plants thus comprises the step of subjecting obnoxious vegetation or weeds to hot fluids such as heated air for a length of time in which the obnoxious vegetation is destroyed or injured without causing injury to the crop plant. In the preferred embodiment of the invention the hot fluids are generated in a combustion chamber remote from the crops and in which combustion is confined and the generated hot fluids directed downwardly at one or more points at either or both sides of one or more crop rows to the extent and for the purpose above described in detail.

In one successful application of my invention combustion gases generated from propane as the fuel issued from a nozzle at temperatures ranging from 1000° F. to 1200° F. and at points about one foot from the crop row killed and shrivelled weed foliage when passed by the weed foliage at a rate of two to four miles per hour without doing injury to the crop. The propane was burned at the rate of 100,000 to 125,000 B. t. u. per hour and dilution air was used to bring the temperature of the combustion gases to those stated above. The apparatus utilized to effect the cultivation of the crops comprised a duct of about four inches in diameter and it terminated in a fish tail nozzle measuring about 6 inches in length and 2 inches in width.

It will be understood that the above values are relative only in that various modifications can be developed in which the temperature of the developed fluids may vary widely from the range above given with a corresponding change in the speed of travel of the duct outlets along the row, and which conditions may be determined by experiment. Thus, it will be observed that the speed of travel of the duct outlet may vary from the values above given which may also necessitate varying of the auxiliary air or dilution air, and also the proportion of the duct outlet may be broader or narrower to give different time ele- While I have disclosed what I consider to be the preferred embodiments of my invention, it will be understood that various modifications and rearrangements may be made therein without departing from the spirit and scope of my invention.

I claim:

1. In a cultivator comprising a wheeled vehicle adapted to travel along a crop row, the combination of a combustion chamber adapted to be carried by said vehicle for burning fuel, a pair of ducts having discharge nozzles and having connection with said chamber for discharging the products of combustion therefrom through said discharge nozzles, and means connected to said ducts adjacent said discharge nozzle for supporting said ducts to extend laterally at either side of the crop row and having the discharge nozzles thereof directed diagonally downwardly and inwardly toward the crop row to bathe the ground about said crop row with the products of combustion issuing therefrom.

2. In a cultivator comprising a wheeled vehicle adapted to travel along a crop row, the combination of a combustion chamber adapted to be carried by said vehicle for burning fuel, a pair of ducts having discharge nozzles associated with said chamber for discharging the products of combustion therefrom through said discharge nozzles, and means connected to said ducts adjacent said discharge nozzle for supporting said ducts to extend laterally at either side of the crop row and having the outlets thereof directed diagonally downwardly and inwardly toward the crop row with the discharge outlets of said ducts at either side of said crop row being offset with respect to each other lengthwise of the crop row to bathe the ground about said crops with the gaseous products issuing therefrom.

3. In a cultivator comprising a wheeled vehicle adapted to travel along a crop row, the combination of a combustion chamber adapted to be carried by said vehicle for burning fuel, a pair of ducts having discharge nozzles associated with said chamber for discharging the products of combustion therefrom through said nozzles, said ducts being supported to extend laterally at either side of the crop row and having the outlets thereof directed diagonally downwardly and inwardly toward the crop row with the nozzles of said ducts being offset with respect to each lengthwise of the vehicle to bathe the ground about said row of crops with the products of combustion issuing therefrom, and ground engaging skids connected to said ducts for guiding the same over the ground.

4. In a cultivator comprising a wheeled vehicle adapted to travel along a crop row, the combination of a combustion chamber adapted to be carried by said vehicle for burning fuel, a pair of ducts having discharge nozzles associated with said chamber for discharging the products of combustion therefrom through said nozzles, and ground engaging skids connected to said ducts for guiding the same over the ground, said ducts having their nozzles supported by said skids to direct the products of combustion issuing therefrom diagonally downwardly and inwardly toward the crop row to bathe the ground about said row of crops therein.

5. In a cultivator comprising a tractor having front wheel means adapted to travel between an adjacent pair of crop rows and rear wheel means adapted to straddle said pair of crop rows, the combination of a combustion chamber adapted to be mounted on said tractor for developing heat by combustion of combustible material therein, a plurality of discharge nozzles having connection with said chamber for discharging products of combustion therefrom, said nozzles being arranged to extend at either side of said crop rows and directed diagonally downwardly and inwardly of the crop rows to effect projection of the products of combustion issuing therefrom upon the ground about said crop rows.

6. In combination, a wheeled vehicle adapted to travel along a crop row, a combustion chamber carried by said vehicle for burning fuel, duct means in communication with said chamber for discharging the products of combustion from the latter, ground engaging means connected to said duct means for supporting the discharge end of the latter in position so that the products of combustion are directed upon the ground laterally of the crop row, and means for said duct means for mounting the same for movement of the discharge end thereof upwardly and downwardly relative to said combustion chamber when said ground engaging means passes over uneven ground.

PRICE C. McLEMORE.

REFERENCES CITED

The following references are of record in the file of this patent:

UNITED STATES PATENTS

| Number | Name | Date |
| --- | --- | --- |
| 600,106 | White | Mar. 1, 1898 |
| 1,184,997 | Rawls | May 30, 1916 |
| 1,515,476 | Greenfield | Nov. 11, 1924 |
| 1,547,765 | Lang | July 28, 1925 |
| 1,698,196 | Lang | Jan. 8, 1929 |
| 2,288,569 | Mason | June 30, 1942 |
| 2,408,328 | McLemore | Sept. 24, 1946 |

FOREIGN PATENTS

| Number | Country | Date |
| --- | --- | --- |
| 2,442 | Australia | of 1905 |
| 4,043 | Australia | of 1905 |
| 5,634 | Australia | of 1906 |
| 1,050 | Germany | Mar. 12, 1879 |